May 5, 1970     N. N. DEATON     3,509,645

PALEONTOLOGICAL AND ARCHAEOLOGICAL EDUCATIONAL ARTICLE

Filed Jan. 2, 1968

INVENTOR
NORMAN N. DEATON
BY
Zarley, McKee & Thomte
ATTORNEYS

United States Patent Office 3,509,645
Patented May 5, 1970

3,509,645
PALEONTOLOGICAL AND ARCHAEOLOGICAL EDUCATIONAL ARTICLE
Norman N. Deaton, Rte. 4, Newton, Iowa 50208
Filed Jan. 2, 1968, Ser. No. 694,613
Int. Cl. G09b 23/00
U.S. Cl. 35—10                 8 Claims

ABSTRACT OF THE DISCLOSURE

A new article of manufacture for teaching the excavation of fossils or the like. The article is comprised of a slab including a relatively hard base portion having one or more specimens protruding upwardly therefrom. The base portion and the specimens are imbedded in a relatively soft matrix which may be removed from the base portion and the fossils by utilizing excavation procedures thereby exposing the fossils for display or collection purposes. A second embodiment of the article includes at least two material layers with various artifacts, fossils or the like either removably imbedded in the layers or removably positioned on one of the layers.

---

It is a principal object of this invention to provide a paleontological and archaeological educational article which aids in the teaching of excavation procedures of fossils, artifacts, etc.

A further object of this invention is to provide a paleontological and archaeological educational article which aids in the teaching of preparation techniques of fossils.

A further object of this invention is to provide a paleontological and archaeological educational article which includes simulated fossils.

A further object of this invention is to provide a paleontological and archaeological educational article which provides a means for mounting fossils and artifacts.

A further object of this invention is to provide a paleontological and archaeological educational article which permits persons to experience methods used by museum preparators in uncovering fossils.

A further object of this invention is to provide a paleontological and archaeological educational article which is realistic.

A further object of this invention is to provide a paleontological and archaeological educational article including a relatively hard base slab portion having one or more specimens protruding upwardly therefrom and which are imbedded in a relatively soft matrix material positioned thereover.

A further object of this invention is to provide a paleontological and archaeological educational article which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
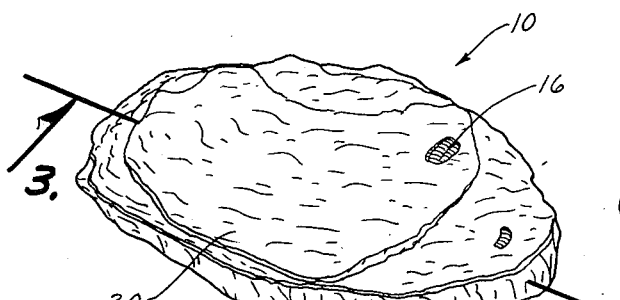
FIG. 1 is a top perspective view illustrating the article with fossils slightly protruding from the top layer.
Figure 2:
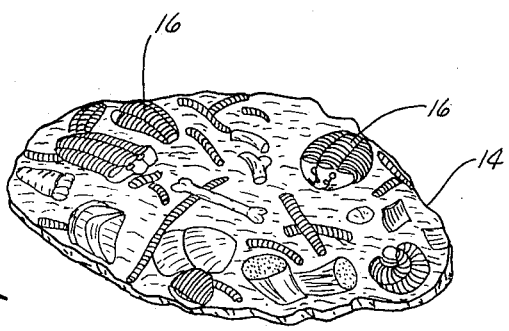
FIG. 2 is a perspective view of the bottom layer before the upper layer is placed thereover.
Figure 3:
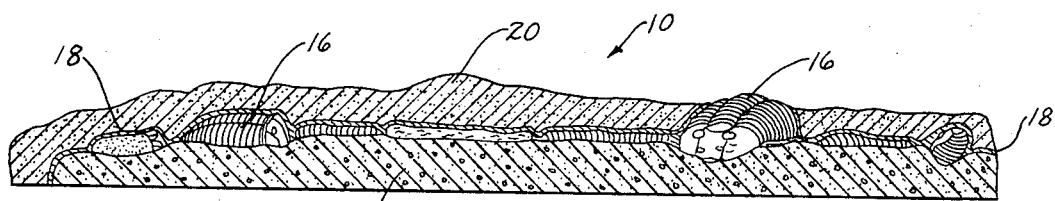
FIG. 3 is an enlarged sectional view as seen along lines 3—3 of FIG. 1.
Figure 4:
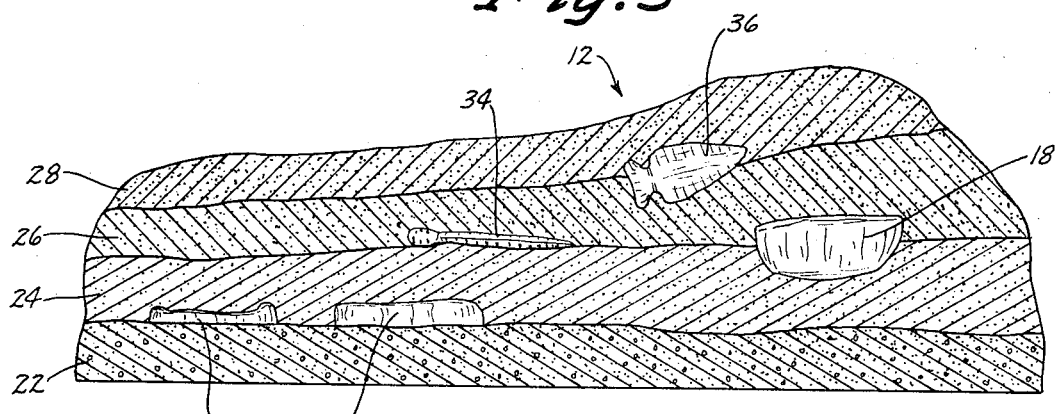
FIG. 4 is a sectional view of an embodiment of this invention illustrating a multi-layer unit with various artifacts either imbedded in various layers or removably positioned on a layer below.

FIGS. 1, 2 and 3 illustrate one version of the article which is generally designated by the reference numeral 10 while another version of the article is illustrated in FIG. 4 and is generally designated by the reference numeral 12. Article 10 includes a relatively hard base portion 14 having a plurality of fossil specimens 16 protruding upwardly therefrom. Preferably, the specimens 16 are an integral molded part of the base portion 14 and would be comprised of the same material as the base portion 14. Thus, the specimens 16 are in fact merely replicats of the fossil specimens but it should be understood that the fossil specimens 16 could be replaced by actual fossils. Base portion 14 may be comprised of a hard plastic if desired but it has been found that the most preferable material to use in the base portion 14 is a casting stone which is a gypsum product commonly available on the market. The casting stone is approximately ten times harder than plaster of paris and is ideally suited for use in the base portion 14.

If desired, base portion 14 and the specimens 16 may be covered with a stain or lacquer 18 to waterproof the base portion 14 and the fossil specimens 16. Base portion 14 and the fossil specimens 16 are covered by or imbedded in a matrix generally designated by the reference numeral 20. Matrix 20 is preferably comprised of dental plaster, powdered water clay, or molding plaster or Cab-O-Sil. FIG. 3 illustrates one of the fossil specimens 16 as partially protruding outwardly through the matrix 20 but it can be appreciated that the matrix 20 can entirely cover the fossil specimens 16 if so desired. Additionally, the fossil specimens 16 may be painted or colored so as to appear exactly as they would in their natural occurrence.

The article 10 aids in the teaching of excavation procedures of the fossils and also teaches the techniques of preparing the same. Thus, the article 10 is furnished to a student or the like so that the student may practice excavating the fossils from the article 10. The matrix 20 may be removed by picking or scraping it away from the fossil specimens 16 with a suitable tool such as a pointed object or the like. As the specimen is approached, the student should gently scrape the matrix material away therefrom to avoid damage to the fossil specimens 16. It has also been found that by coloring the matrix material 20 differently from that of base portion 14, the student is better able to discern between the matrix 20 and the fossil specimens 16. A brush or the like is then used to clean the matrix and dust from the fine detail of the fossil specimens 16. The matrix dust may be easily removed by simply dampening the same with a wet sponge or the like. The fossil specimens 16 and the base portion 14 may then be shellaced if desired and mounted on a wood plaque or the like for display purposes. Thus, the student gains valuable excavation and preparation experience in removing the matrix 20 from the fossil specimens 16 and the base portion 14.

As previously stated, the article 12 is another version of the article and is seen to include a plurality of layers 22, 24, 26 and 28. The layers may be comprised of different materials or different colors if desired so as to give the appearance of being different layers of sediment or the like as would actually occur in nature. The layers may be comprised of a limestone material, powdered water clay, molding plaster, dental plaster or the like. The numerals 30 and 32 designate removable pottery pieces which are removably positioned on top of the bottom layer 22 and which are imbedded in the layer 24. Likewise, the numeral 34 designates an arrowhead which is removably positioned on the upper surface of layer 24 and imbedded in layer 26. The numerals 36 and 38 designate imbedded artifacts which are imbedded in at least two layers. The article 12 is furnished to the student and it is then up to the student to remove the artifacts 30, 32, 34, 36 and 38 from the layers in the article 12. The artifacts are removed from the article by utilized established excavation procedures. While FIG. 4 illustrates artifacts, it should be understood that the artifacts could be substituted by fossils or the like. After the artifacts or the like have been removed from the article 12, the artifacts may be mounted for display purposes.

The articles 10 and 12 aid in the teaching of excavation procedures of buried objects such as fossils, artifacts, etc. The student gains valuable excavation and preparation experience in excavating the fossils or the artifacts from the articles due to the realistic nature of the aricles. Thus it can be seen that the articles accomplish at least all of their stated objectives.

Some changes may be made in the construction and arrangement of my paleontological and archaeological educational article without departing from the real spirit and purpose of my invention, and it is my intention to cover by my claims, any modified forms of structure or use of mechanical equivalents which may be reasonably included within their scope.

I claim:

1. As a new article of manufacture, a composite article for teaching the excavation of buried objects, comprising,
   a first material layer,
   at least one object on said first material layer, said object representing a specimen of paleontological or archaeological significance,
   said first material layer and said object being comprised of a relatively hard material,
   and a second material layer superimposed over said object and said first layer, said second material layer consisting substantially of one from the group of dental plaster, powdered water clay and molding plaster,
   said second material layer being comprised of a relatively soft material which can be easily removed with a chipping tool means.

2. The article of claim 1 wherein said first material layer and said one object are of integral construction.

3. The article of claim 2 wherein said first material layer and said object are comprised of a plastic material.

4. The article of claim 2 wherein said first material layer and said object are comprised of a casting stone material.

5. The article of claim 2 wherein said first material layer and said object are coated over with a waterproofing material.

6. The article of claim 2 wherein said object is an actual fossil.

7. The article of claim 2 wherein said object is comprised of an artifact.

8. The article of claim 2 wherein said object partially protrudes through said second material layer.

References Cited

UNITED STATES PATENTS

| | | | |
|---|---|---|---|
| 372,094 | 10/1887 | Thommen | 164—15 |
| 727,140 | 5/1903 | Hill et al. | 35—10 |
| 1,446,941 | 2/1923 | Smith | 35—26 |
| 1,813,280 | 7/1931 | Cole | 35—10 |
| 2,394,282 | 2/1946 | Withers | 35—1 |
| 2,876,588 | 3/1959 | Tietz et al. | |
| 3,047,965 | 8/1962 | Walker et al. | 35—10 |
| 3,123,919 | 3/1964 | Meador | 35—26 |
| 3,137,080 | 6/1964 | Zang | 35—41 |

EUGENE R. CAPOZIO, Primary Examiner

W. H. GRIEB, Assistant Examiner